Aug. 23, 1949.  J. MARCO  2,479,580
PIPE COUPLING
Filed May 1, 1946  3 Sheets-Sheet 1
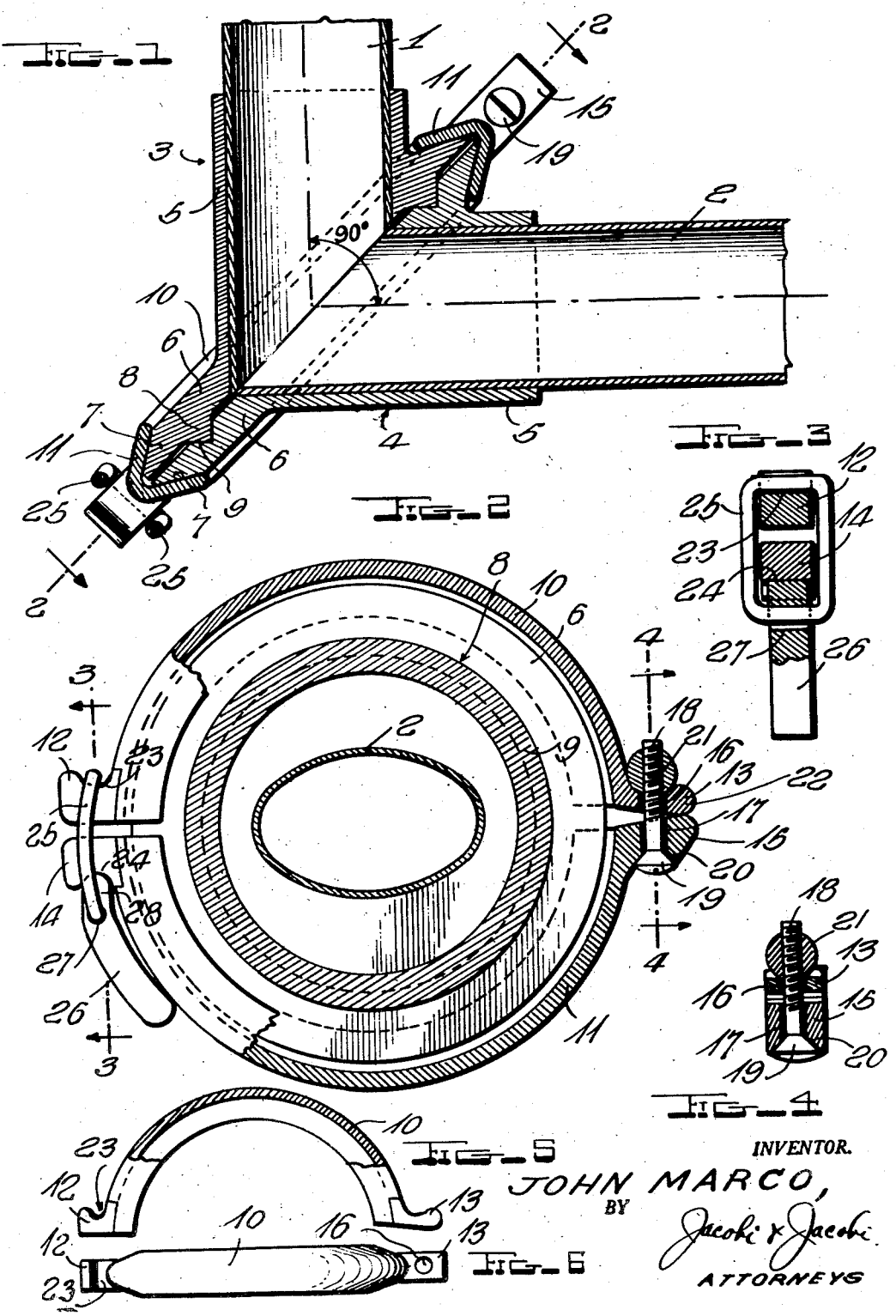
INVENTOR.
JOHN MARCO,
BY
Jacobi & Jacobi
ATTORNEYS Aug. 23, 1949.  J. MARCO  2,479,580
PIPE COUPLING
Filed May 1, 1946  3 Sheets-Sheet 2
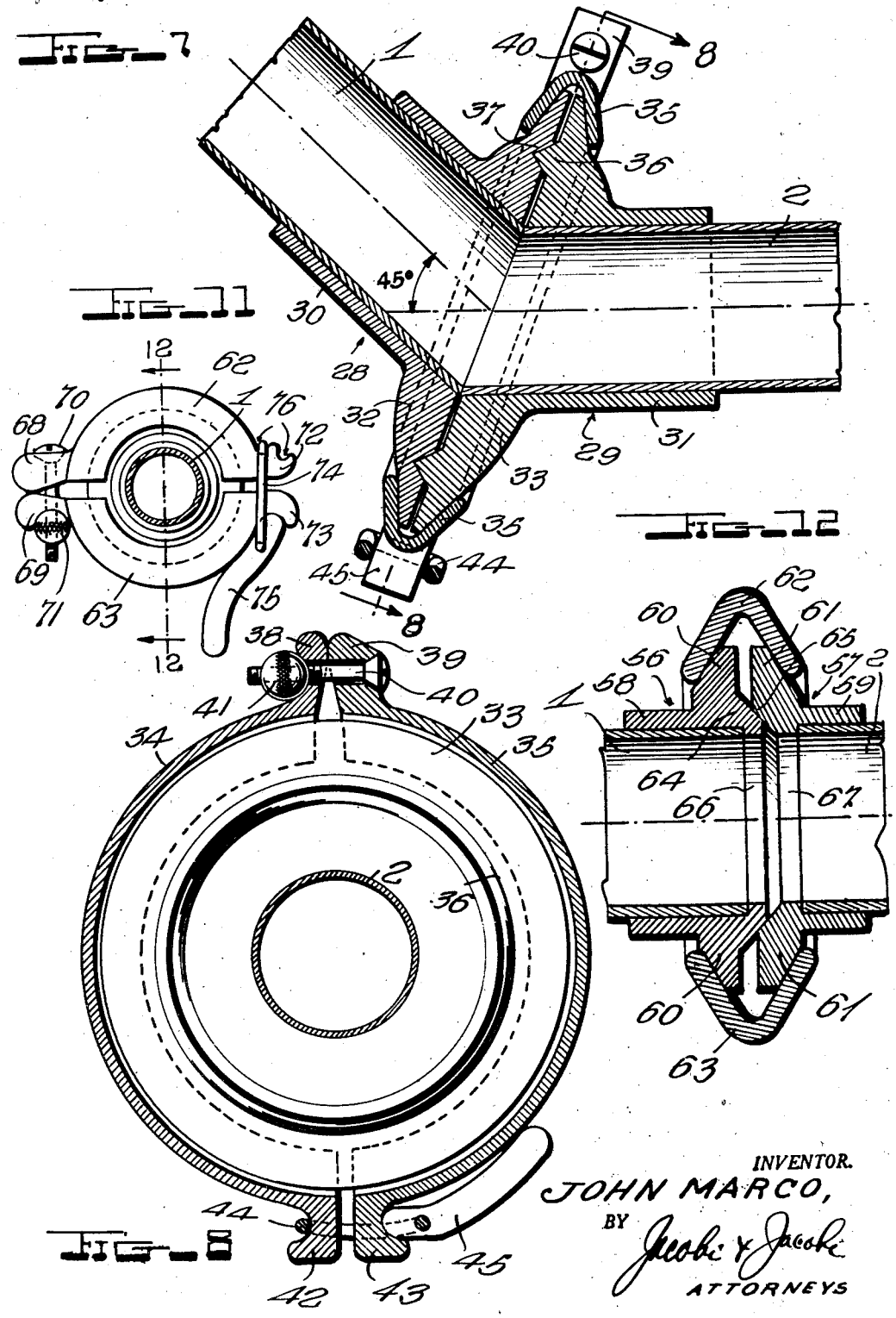
INVENTOR.
JOHN MARCO,
BY Jacobi & Jacobi
ATTORNEYS Aug. 23, 1949.  J. MARCO  2,479,580
PIPE COUPLING
Filed May 1, 1946  3 Sheets-Sheet 3
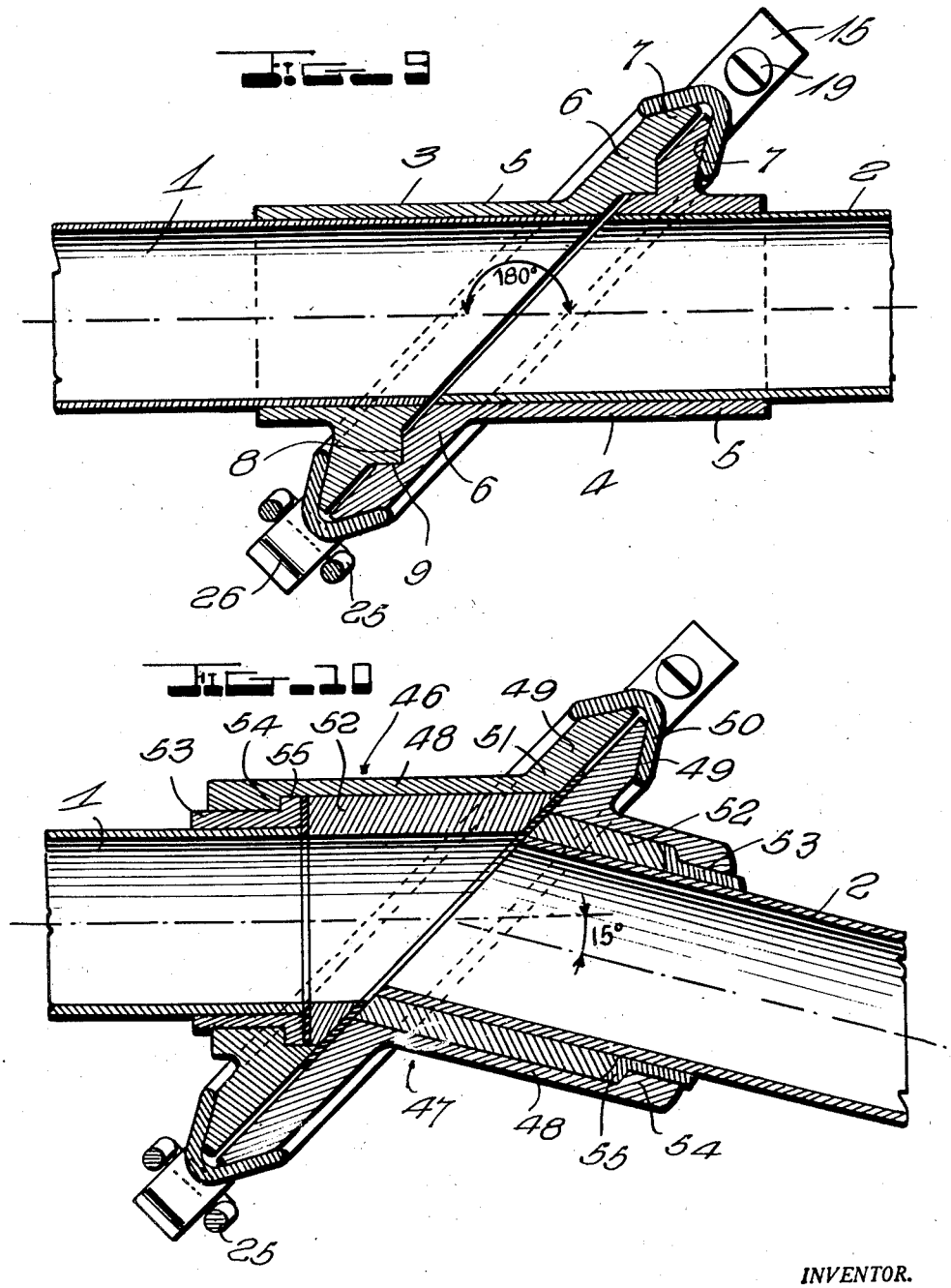
INVENTOR.
JOHN MARCO,
BY
Jacobi & Jacobi
ATTORNEYS Patented Aug. 23, 1949

2,479,580

UNITED STATES PATENT OFFICE 2,479,580

PIPE COUPLING

John Marco, Wilmington, Del.

Application May 1, 1946, Serial No. 666,339

3 Claims. (Cl. 285—129)

This invention relates to pipe couplings and more particularly to a coupling for connecting pipes forming parts of food processing machines and in which the pipes must not only be firmly held connected with each other, but also permitted to be readily disengaged and thoroughly cleansed.

Another object of the invention is to so form the coupling that sections thereof may be very easily secured and released without the use of a wrench or other tool.

Another object of the invention is to provide a coupling wherein threads are eliminated and crevices in which dirt may accumulate, reduced to a minimum.

Another object of the invention is to provide the coupling with pipe-engaging sections having collars or flanges firmly held to each other by a clamping ring so formed that it may be disposed about the collars and tightened to hold the collars pressed firmly against each other.

Another object of the invention is to so form the clamping ring that when it is tightened, an annular rib of one flange will be forced into a groove in the other flange and a fluidtight joint formed.

Another object of the invention is to provide the ring with companion sections for engaging about peripheries of the flanges and a clamping member for engaging about ends of the ring sections and drawing them towards each other to a constructed position.

Another object of the invention is to so form a link of the clamp that it has resiliency serving to apply pressure to the ring sections and also serving to prevent accidental slipping of the link from about ears of the ring sections.

Another object of the invention is to provide a coupling of very simple construction which is easy to operate and so formed that the pipes connected by the coupling may be disposed at various angles to each other.

The invention is illustrated in the accompanying drawings wherein:

Figure 1 is a sectional view showing pipes connected by means of the improved coupling and disposed at an angle of 90° to each other.

Figure 2 is a view taken along line 2—2 of Figure 1, portions being in elevation.

Figure 3 is a fragmentary sectional view taken along line 3—3 of Figure 2.

Figure 4 is a sectional view taken along line 4—4 of Figure 2.

Figure 5 is a view showing one member of the clamping ring partially in side elevation and partially in longitudinal section.

Figure 6 is an edge view of the ring section.

Figure 7 is a longitudinal sectional view showing pipes at an angle of 45° and connected by a modified form of coupling.

Figure 8 is a transverse sectional view taken along line 8—8 of Figure 7.

Figure 9 is a view showing pipes disposed at an angle of 180° and connected by a coupling of the improved construction.

Figure 10 is a view showing pipes connected by a coupling of modified construction and disposed at an angle of 15°.

Figure 11 is a view showing pipes connected by another modified form of coupling.

Figure 12 is a longitudinal sectional view taken along line 12—12 of Figure 11.

The pipes 1 and 2 are portions of pipes which may constitute elements of a homogenizing machine, or other machine, including pipes which must be very tightly connected but so connected that they may be readily taken apart for thorough cleansing. These pipes have their ends cut diagonally so that they may be disposed in angular relation to each other at various angles as shown in the drawings. These pipes are connected by a coupling formed of companion sections, each of which has a sleeve 5 surrounded at its inner end by a diagonally disposed annular flange or collar 6. These flanges have bevelled marginal edge faces 7 so that when the collars of the two sections 3 and 4 are in face to face contact with each other, they form a structure V-shaped in cross section at the meeting inner ends of the coupling sections. The collar or flange of the section 3 carries an annular rib 8 which is V-shaped in cross section and protrudes from its flat inner face concentric to the flange 6 and the collar or flange of the section 4 has its inner face formed with an annular groove 9 constituting a seat to receive the annular rib 8. Side faces of the rib 8 have close contacting engagement with side walls of the groove 9 and when the flanges are forced towards each other, a fluidtight joint will be formed. The angle of the side faces of the rib with respect to the angle of the side walls of the groove are such that when the rib enters the groove its side faces have a line contact with the walls of the groove making a wedging fit and eliminating any likelihood of leakage. Since the collars or flanges and the rib and the groove into which it fits are circular, the two sections may be turned from the position of Figure 1 in which the sleeves 5 extend at an angle of 90° towards the position of Figure 9 wherein the sleeves are at an angle of 180° to each other and the connected pipes 1 and 2 disposed in alignment. The pipes 1 and 2 are firmly secured in the sleeves 5 by brazing or welding and cannot slip longitudinally through the sleeves or have turning movement therein. After the pipes have been firmly secured in the sleeves, portions of the pipes which may protrude from inner ends of the sleeves, will be cut off and ground to dispose ends of the pipes flush with inner faces of the flanges or collars.

In order to secure the two sections 3 and 4 together with the rib 8 forced into the groove 9, there has been provided a clamping ring consisting of companion sections 10 and 11. These sections are formed of strong metal and each is arcuate longitudinally and substantially V-shaped in cross section so that they may straddle peripheral portions of the flanges 6 and 7 with their side walls in contact with the bevelled surfaces 7 of the flanges. The ring section 10 has ears 12 and 13 at its ends and the ring section 11 has similar ears 14 and 15 at its ends. Referring to Figures 2 and 4 it will be seen that the ears 13 and 15 are formed with openings 16 and 17 to receive a bolt 18 having its head 19 engaged in the seat 20 of the ear 15. This bolt carries a spherical nut 21 which rests in a seat formed by the thickened end portion of ear 13, and from an inspection of Figure 2, it will be seen that since the enlarged end portion 22 of the ear 13 is rounded in cross section, the clamp section 10 may have rocking movement relative to clamp section 11 and the clamp sections be moved into close fitting engagement with margins of the flanges. The ears 12 and 14 are thick and formed with transversely extending channels or seats 23 and 24, constituting seats to receive ends of a link 25 and a lever 26, the lever being formed near one end with an opening 27 to loosely receive the link. This inner end of the lever terminates in a rounded end surface 28 to engage in seat 24 and the outer end of the lever may also be rounded. It should also be noted that the link is curved longitudinally and since the link is formed of resilient metal, it will have a spring action and apply tension to the clamp sections 10 and 11 when the link is engaged about lugs 12 and 14 and the lever swung inwardly against section 11. By adjusting the nut 21, pull, exerted by the link, will be regulated and side walls of these clamp sections caused to exert desired binding action against the beveleld faces of the flange 6. When the sections 3 and 4 of the coupling are to be released, so that the pipes 1 and 2 may be removed for cleansing, it is merely necessary to swing the lever 26 away from the clamp section 11 and the link may then be disengaged from the ears 12 and 14 and the clamp sections then swung apart and moved out of engagement with the flanges. The two sections 3 and 4 will then be completely released and the pipes may be lifted out of place, cleaned and reassembled.

The coupling illustrated in Figures 7 and 8 is similar to that described, but the sections 28 and 29 have their sleeves 30 and 31 formed with collars or flanges 32 and 33 which have flat inner faces and their outer side faces so curved transversely that the flanges taper towards their peripheral edges. When the clamping ring formed of sections 34 and 35 is applied and tightened, the walls of the ring sections have wedging engagement with the sloping outer side faces of the flanges and the flanges are forced toward each other so that the annular rib 36 of flange 33 will be forced into the annular groove 37 of flange 32 and a tight joint formed between the two sections 28 and 29. The sections 34 and 35 of the clamping ring are similar in construction to the ring sections 10 and 11 and are provided with ears 38 and 39 bored to receive a bolt 40, having a spherical nut 41, there being also ears 42 and 43 for encirclement by a link 44 carried by a pressure exerting lever 45.

In Figure 10 there has been shown a coupling which may accommodate itself to pipes of different diameters. The sections 46 and 47 of this coupling each have a sleeve 48 formed with an annular flange or collar 49 about its inner end. These flanges are encircled by a clamping ring similar in construction to those already described, but the inner side faces of both flanges are flat instead of one being formed with an annular rib and the other with an annular groove to receive the rib. A tight joint is formed by inserting a gasket 51 between the inner side faces of the flanges, the gasket being formed of compressible material so that when the ring is tightened, the gasket will be compressed and a tight joint formed. Inner and outer bushings 52 and 53 are fitted within the sleeves 48 and the outer end portion of the sleeve is inwardly thickened to form an annular shoulder 54 for engagement by the outstanding annular shoulder 55 of bushing 53. By selecting bushings of the proper thickness, pipes of different diameters may be thrust into the sleeves and have snug fit therein.

Figures 11 and 12 illustrate another modified form of coupling wherein the two coupling sections 56 and 57 are provided with sleeves 58 and 59 carrying outstanding annular flanges 60 and 61. The flanges have bevelled outer side faces for engagement by the diagonally disposed side walls of the sections 62 and 63 of a clamping ring and the section 56 of the coupling is formed at its inner end with a bevelled extension 64 for bearing against the bevelled surface 65 formed on the inner end of the coupling section 57. Inwardly extending annular shoulders 66 and 67 are formed at inner ends of the two coupler sections forming abutments for the inner opposed sections which are fitted within and brazed to the sleeves 58 and 59. The clamping ring is similar in construction to those previously described and has its sections 62 and 63 formed with ears 68 and 69 to receive a bolt 70 carrying a spherical nut 71, the other ends of these ring sections being formed with ears 72 and 73 about which fits the link 74 of the lever 75. It should be noted, however, that the ear 72 is formed with inner and outer recesses forming seats 76 so that the link may be moved longitudinally of the ear 72 to adjusted positions, thus controlling the pressure exerted by the link.

In all forms of the coupling illustrated and described the coupling sections may be connected or released and when the clamping rings are tightened, a joint will be formed which is exceptionally tight and positively leak-proof. Wrenches, pliers, or other tools are obviously unnecessary when connecting or disconnecting the coupling sections and when the pipe sections are separated they may be thoroughly cleansed and sterilized, and readily assembled at various angles.

It will be seen from the foregoing description that I have provided a comparatively simple, inexpensive and efficient means for carrying out the various objects of the invention and while I have described the elements best adapted to perform the functions set forth, it is apparent that various changes in form, proportion and in the minor details of construction may be resorted to, without departing from the spirit or sacrificing any of the principles of the invention.

Having thus described the invention, what is claimed is:

1. A pipe coupling comprising companion sections each having a pipe-receiving sleeve and a collar about the inner end of its sleeve, the collars having confronting inner side faces and bevelled outer side faces converging towards outer marginal edges of the collars, a clamping ring for engaging about said collars formed of circumferentially extending sections V-shaped in cross section for wedging engagement with the bevelled outer surfaces of the collars, outstanding ears at ends of the ring sections, a bolt passing through one set of ears and carrying a spherical nut constituting a fulcrum permitting rocking of the ring sections to opened and closed positions, and a link or resilient material for engaging about the other set of ears carrying at one end a loosely mounted lever for engaging the adjacent ear and forcing the ring sections into clamping engagement with the collars when the lever is swung inwardly to a pressure exerting position.

2. A pipe coupling comprising companion sections each having a pipe-receiving sleeve and a collar about the inner end of its sleeve, the collars having confronting inner side faces and bevelled outer side faces converging towards outer marginal edges of the collars, one ring section having its inner side face formed with an annular groove V-shaped in cross section, the other ring section having its inner side face formed with an annular rib V-shaped in cross section for engaging in the groove of the first collar, a clamping ring for surrounding said collars formed of circumferentially extending sections V-shaped in cross section for straddling the collars and engaging the bevelled outer side faces thereof, ears extending from ends of said collars, a bolt passing through one set of ears and mounting the ring sections for movement towards and away from each other, and a clamp for engaging about the other set of ears and exerting pressure thereon to force the ring sections into binding engagement with the collars.

3. A pipe coupling comprising companion sections each having a pipe-receiving sleeve and an outstanding annular collar about its inner end, said collars being disposed diagonally of their companion sleeves and having flat inner side faces, the inner side face of one collar being formed with an annular groove and the inner side face of the other collar being formed with an annular rib for engaging in the groove, a ring for encircling peripheral portions of said collars formed of circumferential sections V-shaped in cross section for forcing the collars towards each other to form a sealed joint when the ring is tightened, a member adjustably holding said ring sections in pivotal connection with each other, ears extending from said ring sections at opposite ends thereof from the pivotal connection, and a clamp for engaging about said ears and forcing the ring sections into tight binding engagement with the collars.

JOHN MARCO.

REFERENCES CITED

The following references are of record in the file of this patent:

UNITED STATES PATENTS

| Number | Name | Date |
| --- | --- | --- |
| 557,361 | Church | Mar. 31, 1896 |
| 880,415 | Stevens | Feb. 25, 1908 |
| 1,185,487 | Eastman | May 30, 1916 |
| 2,020,156 | Muchnic | Nov. 5, 1935 |
| 2,118,671 | Green | May 24, 1938 |

FOREIGN PATENTS

| Number | Country | Date |
| --- | --- | --- |
| 412,186 | Great Britain | June 19, 1934 |